United States Patent [19]

Vieira et al.

[11] Patent Number: 5,261,953

[45] Date of Patent: * Nov. 16, 1993

[54] INKS

[75] Inventors: Eric Vieira, Basel; David G. Leppard, Marly; Hugh S. Laver, Fribourg; Vien V. Toan, Lentigny, all of Switzerland

[73] Assignee: Ciba-Geigy Corporation, Ardsley, N.Y.

[*] Notice: The portion of the term of this patent subsequent to Feb. 18, 2009 has been disclaimed.

[21] Appl. No.: 795,209

[22] Filed: Nov. 20, 1991

Related U.S. Application Data

[62] Division of Ser. No. 695,857, May 6, 1991, Pat. No. 5,089,050.

[30] Foreign Application Priority Data

May 10, 1990 [CH] Switzerland ............. 1587/90

[51] Int. Cl.$^5$ .............................................. C09D 11/02
[52] U.S. Cl. .................................. 106/20 R; 106/22 R; 560/61; 562/473
[58] Field of Search ............... 106/20, 22, 20 R, 22 R; 560/61; 562/473

[56] References Cited

U.S. PATENT DOCUMENTS

| | | | |
|---|---|---|---|
| 4,247,694 | 1/1981 | Rasberger | 546/5 |
| 4,256,493 | 3/1981 | Yokoyama et al. | 106/22 |
| 4,308,194 | 12/1981 | Irick, Jr. et al. | 524/83 |
| 4,642,322 | 2/1987 | Wehner et al. | 524/191 |
| 4,784,692 | 11/1988 | Umeda et al. | 106/21 |
| 4,833,119 | 5/1989 | Umeda et al. | 503/210 |
| 4,857,572 | 8/1989 | Meier et al. | 560/61 |
| 5,089,050 | 2/1992 | Vieira et al. | 106/22 |
| 5,098,477 | 3/1992 | Vieira et al. | 106/22 |

FOREIGN PATENT DOCUMENTS 2088777 6/1982 United Kingdom.

OTHER PUBLICATIONS

Derwent Abst. 11220/K/05, Dec. 1982.
Derwent Abst. 87-174795/25, May 1987.
Derwent Abst. 83-835451/49, Oct. 1983.

*Primary Examiner*—Helene Klemanski
*Attorney, Agent, or Firm*—William A. Teoli, Jr.; Luther A. R. Hall

[57] ABSTRACT

Inks, in particular for ink-jet printing, containing, as stabilizer, a water-soluble compound of the formula

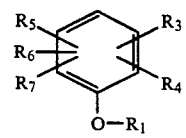

in which $R_1$ to $R_7$ are as defined in claim 1, and recording materials containing these compounds.

4 Claims, No Drawings

INKS

This is a divisional of Ser. No. 695,857 filed May 6, 1991 now U.S. Pat. No. 5,089,050.

The present invention relates to novel inks, in particular those for ink-jet printing.

Inks, including those which are suitable for ink-jet printing, usually contain water-soluble dyes. However, the latter, without exception, have lower light fastness than, for example, the coloured pigments used in conventional printing processes. As a consequence, the recordings produced by ink-jet printing are of limited permanence in light; after some time, they begin to fade or discolour.

In order to solve this problem, it has been proposed, for example, in U.S. Pat. No. 4,256,493, to add a water-soluble UV absorber of the sulfonated hydroxybenzophenone type to inks. The metals salts of such compounds have also been proposed, in JP-A-6277/88, as light stabilisers for ink-jet printing inks. However, benzophenones of this type and their salts have the disadvantage of causing discoloration with certain dyes, in particular black dyes. Furthermore, JP-A-57/207 659 discloses the use of dihydroxybenzenes as stabilisers. Gallic acid and 3,5-dimethoxy-4-hydroxybenzoic acid are also mentioned therein. JP-A-62/106 971 discloses the use of dialkylhydroquinones, for example 2,5-di-t-amylhydroquinone, and of the sodium salt of 2-hydroxy-4-methoxy-5-sulfobenzophenone and 2,2'-dihydroxy-4,4'dimethoxy-5-sulfobenzophenone. JP-A-58/183 769 describes N-alkanolamine salts of m-digallic acid as additives for ink-jet printing inks. Furthermore, GB-A-2 088 777 describes water-insoluble phenol derivatives and their use in recording materials for ink-jet printing.

Further phenol derivatives have now been found which are highly suitable for use in inks and are able to stabilise prints produced therewith.

The present application thus relates to an ink which contains at least one water-soluble compound of the formula

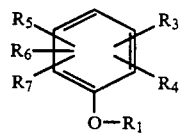

(1)

in which $R_1$ is hydrogen, alkyl having 1 to 4 carbon atoms, allyl or $-CO-CH_3$, $R_3$ and $R_4$, independently of one another, are hydrogen or $-CO_2^\ominus M^\oplus$, and $R_5$, $R_6$ and $R_7$, independently of one another, are hydrogen, alkyl in each case having 1 to 8 carbon atoms which is unsubstituted or substituted by $-CO_2R_8$, $-CO_2^\ominus M^\oplus$ or phenyl, or are $-CO_2R_8$ where $R_8$ is a group of the formula $-(CH_2CH_2O)_{\overline{n=20}}R_{11}$ in which $R_{11}$ is hydrogen, alkyl having 1 to 4 carbon atoms or a group of the formula

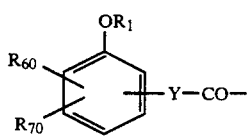

(1a)

in which $R_1$ is as defined above, Y is a direct bond or alkylene having 1 to 8 carbon atoms, and $R_{60}$ and $R_{70}$, independently of one another, are hydrogen or alkyl in each case having 1 to 8 carbon atoms, $M^\oplus$ is a monovalent, divalent or trivalent metal cation, $H^\oplus$ or a group of the formula $^\oplus N(R_{17})(R_{12})(R_{13})(R_{14})$ in which $R_{17}$, $R_{12}$, $R_{13}$ and $R_{14}$, independently of one another, are hydrogen, alkyl in each case having 1 to 8 carbon atoms, alkyl having 2 to 8 carbon atoms which is substituted by 1 to 3 hydroxyl groups or is interrupted by oxygen, alkenyl in each case having 3 to 5 carbon atoms or benzyl, at least one of the substituents $R_3$ to $R_7$ being $-CO_2^\ominus M^\oplus$ or $-CO_2R_8$.

The present invention also relates to a recording material which contains at least one compound of the formula (1), to a process for stabilising ink-jet prints and to the novel compounds of the formula (1d).

$R_1$ is hydrogen or alkyl having 1 to 4 carbon atoms, such as methyl, ethyl, propyl, sec-propyl, butyl or tert-butyl, or furthermore allyl or $-CO-CH_3$. The substituents $R_5$, $R_6$ and $R_7$, independently of one another, are hydrogen or alkyl having 1 to 8 carbon atoms, for example methyl, ethyl, butyl, hexyl, heptyl, octyl or a corresponding branched isomer. Suitable substituents for these alkyl radicals are those of the formulae $-CO_2R_8$ and $-CO_2^\ominus M^\oplus$ and phenyl. Furthermore, $R_5$, $R_6$ and $R_7$ may alternatively be $-CO_2R_8$.

$R_8$ is a group of the formula $-(CH_2CH_2O)_{\overline{n=20}}R_{11}$ in which $R_{11}$ is hydrogen or alkyl having 1 to 4 carbon atoms, such as methyl, ethyl or butyl. $R_{11}$ may furthermore be a group of the formula

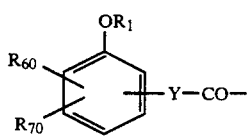

(1a)

in which $R_1$ is as defined above, Y is a direct bond or alkylene having 1 to 8 carbon atoms, for example methylene, ethylene, butylene, hexylene, octylene or a branched radical such as $-C(CH_3)_2-CH_2-$ and $-C(CH_3)_2-CH_2-CH_2-CH_2-$, and $R_{60}$ and $R_{70}$, independently of one another, are hydrogen or alkyl in each case having 1 to 8 carbon atoms.

In the definitions above, $M^\oplus$ is a monovalent, divalent or trivalent metal cation, such as $Li^\oplus$, $Na^\oplus$, $K^\oplus$, $Mg^{2\oplus}$, $Ca^{2\oplus}$, $Ba^{2\oplus}$, $Zn^{2\oplus}$, $Al^{3\oplus}$, $Cr^{3\oplus}$ and $Fe^{3\oplus}$, furthermore $H^\oplus$ or an ammonium group of the formula $^\oplus N(R_{17})(R_{12})(R_{13})(R_{14})$ in which $R_{17}$, $R_{12}$, $R_{13}$ and $R_{14}$, independently of one another, are hydrogen, alkyl having 1 to 8 carbon atoms, alkyl having 2 to 8 carbon atoms which is substituted by 1 to 3 hydroxyl groups or is interrupted by oxygen, or are alkenyl having 3 to 5 carbon atoms or benzyl. Examples of alkyl and alkenyl groups which are suitable for the substituents $R_{17}$, $R_{12}$, $R_{13}$ and $R_{14}$ are those given above in the definitions of $R_1$ and $R_2$.

The inks according to the invention have good light stability. They can be used, for example, for felt-tip pens, ink pads for rubber stamps, fountain pens and pen plotters and in offset, letterpress, flexographic and intaglio printing, and in ink ribbons for dot-matrix and letter-quality printing, but are preferably used in ink-jet printing.

In the printers used today in ink-jet printing, a distinction is made between those with a continuous ink jet and "drop-on-demand" printers, in particular "bubble-jet" printers. The inks according to the invention can be used for these printers. Printing is in particular on ink-jet printing papers and films.

The inks according to the invention may contain water-soluble solvents, for example mono-, di-, tri- or higher ethylene glycols, propylene glycol, 1,4-butanediol, or ethers of such glycols, thiodiglycol, glycerol and ethers and esters thereof, polyglycerol, mono-, di-and triethanolamine, propanolamine, dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone or propylene carbonate.

The inks according to the invention contain dyes as are known for the dyeing of natural fibres. Particular examples are monoazo, disazo or polyazo dyes, reactive dyes, triphenylmethane dyes, xanthene dyes and phthalocyanine dyes. Specific examples are Food Black 2, C.I. Direct Black 19, C.I. Sulphur Black 1, Acid Red 35, Acid Red 14, Acid Red 52, Acid Yellow 17, Acid Yellow 23 and copper phthalocyanines, furthermore Direct Black 38, Direct Black 168, Acid Red 249, Direct Red 227, Direct Yellow 86, Direct Yellow 132, Acid Blue 9, Direct Blue 86 and Direct Blue 199 and Reactive Red 40, and the azo dyes mentioned in EP-A-366 121.

The inks may also contain other conventional additives, for example binders, surfactants, biocides, corrosion inhibitors, sequestrants, pH buffers and conductivity additives. They may also contain further UV absorbers or light stabilisers. In general, however, the addition according to the invention of a stabilizer of the formula (1) is sufficient to stabilise the ink.

Particularly suitable inks for continuous ink-jet printing are those based on solvents. Examples of solvents used are short-chain alcohols, ketones and Cellosolvs. Particularly suitable dyes for inks of this type are C.I. "solvent" and "disperse" dyes. Furthermore, inks of this type generally contain further additives which improve, for example, the viscosity, surface tension or conductivity of the inks. Film-forming binders, such as cellulose nitrate, cellulose acetate phthalate and styrene-maleic acid copolymers may likewise be present in the inks.

Inks which are preferably suitable for use in "drop-on-demand" printers are those based on wax mixtures. They are solid at temperatures below about 50° C. The desired melting point and the hardness and viscosity properties arise from appropriate mixtures of various waxes. Examples are carnuba, montan, paraffin and silicone waxes, furthermore fatty acid esters and fatty acid amides. These inks may again contain additives such as antioxidants, polymers and the additives mentioned for solvent-based inks.

Suitable stabilisers both for solvent-based inks and for wax-based inks are, in particular, compounds of the formula (1) which are readily soluble in organic solvents.

Furthermore, ink-jet printing inks are known which comprise more than one phase. JP-A-75/0 117 067, 79/0 118 237, 80/0 118 238, 81/0 118 238 und 76/0 119 337 describe inks which comprise an aqueous phase in which the dye is soluble and an emulsion of oil drops, the UV absorbers and, if used, also antioxidants. In JP-A-73/0 117 067 and 82/0 118 238, the oil phase containing UV absorbers is microencapsulated and the dye is dissolved in the aqueous phase. By contrast, oil-soluble dyes can be dissolved in an oil together with UV absorbers and, if used, antioxidants. The oil is either emulsified or dispersed in an aqueous phase, as described, for example, in JP-A-74/0 117 067 and 72/0 117 067. The compounds of the formula (1) are highly suitable for stabilising inks of this type; they are water-soluble and can be dissolved in the aqueous phase.

The inks according to the invention preferably contain from 0.01 to 30% by weight, in particular from 0.1 to 20% by weight, of at least one compound of the formula (1).

In a group of preferred inks, $R_1$ in the compound of the formula (1) is hydrogen or alkyl having 1 to 4 carbon atoms, $R_3$ and $R_4$, independently of one another, are hydrogen or $-CO_2^{\ominus}M^{\oplus}$, $R_5$, $R_6$ and $R_7$ independently of one another, are hydrogen, alkyl in each case having 1 to 8 carbon atoms which is unsubstituted or substituted by $-CO_2^{\ominus}M^{\oplus}$ or phenyl, and $M^{\oplus}$ is a monovalent metal cation or $H^{\oplus}$.

Further preferred inks are those in which, in the compound of the formula (1), $R_1$, $R_3$, $R_5$ and $R_6$ are hydrogen, $R_7$ is alkyl having 1 to 8 carbon atoms, and $R_4$ is $-CO_2^{\ominus}M^{\oplus}$.

Other highly suitable inks are those in which the compound of the formula (1) conforms to the formula (1b) or (1c) in which $M^{\oplus}$, $R_5$ and $R_6$ are as defined above, and $R_{11}$ is hydrogen or methyl.

Examples of water-soluble compounds of the formula (1) which are suitable for use in recording materials and inks are those of the formulae

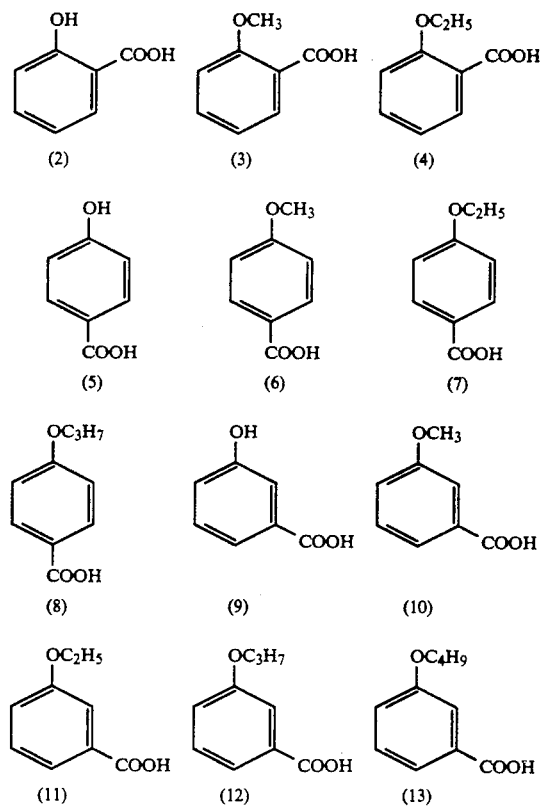

-continued

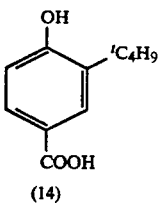
(14)

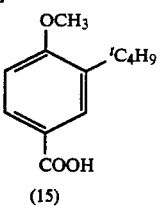
(15)

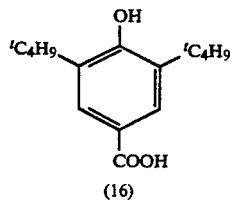
(16)

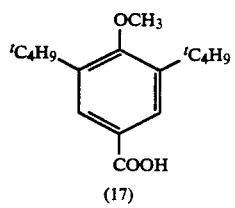
(17)

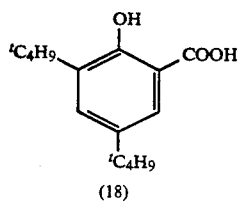
(18)

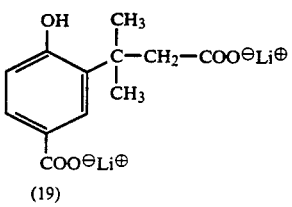
(19)

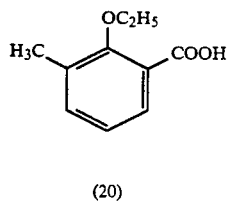
(20)

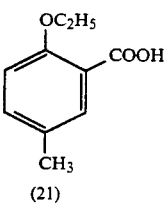
(21)

These compounds are preferably incorporated into inks and recording materials in the presence of bases, such as lithium hydroxide or potassium hydroxide.

Further examples of compounds of the formula (1) conform to the formulae

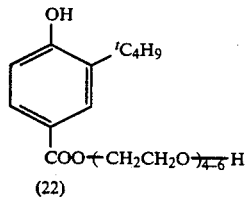
(22)

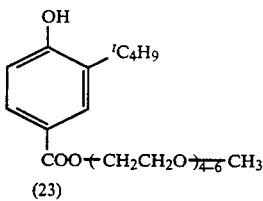
(23)

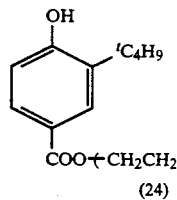
(24)

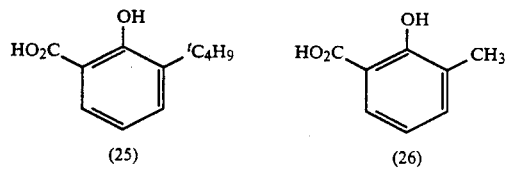
(25)

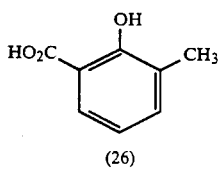
(26)

-continued

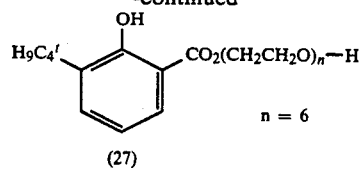

n = 6

(27)

The recording materials according to the invention which are preferably used for ink-jet printing and contain a compound of the formula (1) comprise a base with a surface which can be printed by an ink jet. The base is usually paper or a plastic film and is normally coated on one side with a material which is capable of absorbing inks. This layer preferably contains SiO₂ and polyvinyl alcohol.

Uncoated paper may also be employed, in which case the paper serves simultaneously as base material and ink-absorption layer. Furthermore, materials made from cellulose fibres and textile fibre materials, for example cotton fabric or cotton mixed fabric made from cotton and polyacrylamide or polyester, and which contain compounds of the formula (1) can also be used for ink-jet printing.

The recording materials may also be transparent, as in the case of overhead projection transparencies.

The compounds of the formula (1) can be incorporated into the base material even during production thereof, for example by addition to the pulp in paper-making. A second application method is the spraying of the base material with a solution of the compounds of the formula (1) in water or a readily volatile organic solvent. Particularly in the case of oil-soluble compounds of the formula (1), a suitable method is the spraying or impregnation of the material with an organic solution of a compound of the formula (1). It is also possible to use emulsions or dispersions.

Usually, however, a coating composition with a high dye affinity is coated onto the base material; in this case, the compounds of the formula (1) are added to this coating composition. The coating compositions generally comprise a solid filler, a binder and conventional additives.

The filler is the principal constituent of the coating composition in amount. Examples of suitable fillers are SiO₂, kaolin, talc, clay, calcium silicate, magnesium silicate, aluminium silicate, gypsum, zeolite, bentonite, diatomaceous earth, vermiculite, starch or the surface-modified SiO₂ described in JP-A-60/260 377. Small amounts of white pigments, for example titanium dioxide, baryte, magnesium oxide, lime, chalk or magnesium carbonate, can be used with the filler in the coating composition so long as they do not significantly reduce the density of the ink-jet print.

Coating compositions which are intended for transparent, projectable recording materials must not contain any light-scattering particles, such as pigments and fillers.

The binder binds the fillers to one another and to the base material. Examples of customary binders are water-soluble polymers, for example polyvinyl alcohol, partially hydrolysed polyvinyl acetate, cellulose ethers, polyvinylpyrrolidone and copolymers thereof, polyethylene oxide, salts of polyacrylic acid, sodium alginate, oxidised starch, gelatin, casein, vegetable gum, dextrin, albumin, dispersions and polyacrylates or acrylate-methacrylate copolymers, latices of natural or synthetic rubber, poly(meth)acrylamide, polyvinyl ethers, polyvinyl esters, copolymers of maleic acid, melamin resins, urea resins or chemically modified polyvinyl alcohols, as described in JP-A-61/134 290 and JP-A-61/134 291.

The binder can also contain an additional dye receptor or mordant which improves the fixing of the dye to the coating. Dye receptors for acid dyes are cationic or amphoteric. Examples of cationic receptors are polymeric ammonium compounds, for example polyvinylbenzyltrimethylammonium chloride, polydiallyldimethylammonium chloride, polymethacryloxyethyldimethylhydroxyethylammonium chloride, polyvinylbenzylmethylimidazolium chloride, polyvinylbenzylpicolinium chloride and polyvinylbenzyltributylammonium chloride. Other examples are basic polymers, for example poly(dimethylaminoethyl) methacrylate, polyalkylenepolyamines and products of the condensation thereof with dicyanodiamide, amine-epichlorohydrin polycondensates and the compounds described in JP-A-57/36 692, 57/64 591, 57/187 289, 57/191 084, 58/177 390, 58/208 357, 59/20 696, 59/33 176, 59/96 987, 59/198 188, 60/49 990, 60/71 796, 60/72 785, 60/161 188, 60/187 582, 60/189 481, 60/189 482, 61/14 979, 61/43 593, 61/57 379, 61/57 380, 61/58 788, 61/61 887, 61/63 477, 61/72 581, 61/95 977, 61/134 291, 62/37 181, in U.S. Pat. Nos. 4,547,405 and 4,554,181 and in DE-A-3 417 582 An example of an amphoteric dye receptor is gelatin.

The coating with a high affinity for the dye may contain a number of further additives, for example antioxidants, further light stabilisers (also including UV absorbers which do not correspond to the light stabilisers according to the invention), viscosity improvers, optical whiteners, biocides and/or antistatics.

Examples of suitable antioxidants are, in particular, sterically hindered phenols and hydroquinones, for example the antioxidants mentioned in GB-A-2 088 777 and JP-A-60/72 785, 60/72 786 and 60/71 796.

Examples of suitable light stabilisers are, in particular, organic nickel compounds and sterically hindered amines, for example the light stabilisers mentioned in JP-A-58/152 072, 61/146 591, 61/163 886, 60/72 785 and 61/146 591, GB-A-2 088 777, JP 59/169 883 and 61/177 279.

Suitable UV absorbers, which can be added to a coating composition in combination with compounds of the formula (1), are described, for example, in Research Disclosure No. 24239 (1984), page 284, GB-A-2 088,777 and EP-A-0 280 650. The UV absorbers of the 2-hydroxyphenylbenzotriazole class, especially 2-(2'-hydroxy-3',5'-di-t-amylphenyl)benzotriazole and 2-(2'-hydroxy-3'-t-butyl-5'-(polyglycol propionate)phenyl)-benzotriazole, are particularly suitable for use together with compounds of the formula (1) in recording materials for ink-jet printing. UV absorbers can be added to the coating composition as an emulsion or as a dispersion. If the compound of the formula (1) is an acid, it can be dissolved in the coating composition by adding a hydroxide solution. Compounds of the formula (1) which are not acids can either be dissolved directly in the coating composition or added to the coating composition in the form of an emulsion or suspension.

The coating composition is generally applied to the base, for example paper, and dried by heating. The compounds of the formula (1) can, as stated above, also be applied to the recording material in a separate operation, alone or together with other components described above, as an aqueous solution. Application can be by spraying, sizing in a sizing press, a separate casting operation or by dipping into a bath. Post-treatment of the recording material in this way must be followed by an additional drying operation.

The recording material preferably contains from 1 to 10,000 mg/m², in particular from 50 to 2000 mg/m², of at least one compound of the formula (1).

Of the compounds of the formula (1) used according to the invention, those of the formula

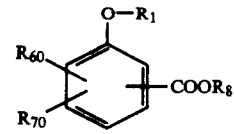

(1d)

where $R_1$, $R_8$, $R_{60}$ and $R_{70}$ are as defined above, are novel.

The compounds according to the invention are highly suitable as stabilisers for dyes in inks, in particular ink-jet printing inks, and in the prints produced therewith.

The compounds according to the invention can be prepared in a conventional manner, for example by esterifying benzoic acid derivatives which are known per se using appropriate alcohols, transesterifying methyl benzoates or, if the molecule contains no hydroxyl groups, reacting the benzoic acid derivatives with acid chlorides.

The examples below illustrate the invention without representing a limitation. Parts and percentages are by weight, unless stated otherwise.

EXAMPLE 1

Coating compositions based on $SiO_2$/polyvinyl alcohol are prepared with and without a stabiliser of the formula (1). In each case, 0.2 g of a 10% solution of Invadin JFC wetting agent (Ciba-Geigy AG), 0.4 g of Polyfix 601 as mordant (Showa High Polymer Co.), 0.22 g of a stabiliser of the formula (1) and 20.7 g of water are added to 14.2 g of a 10% solution of polyvinyl alcohol. 10% lithium hydroxide solution is added dropwise until the stabiliser has dissolved at a pH of about 7. 2.0 g of silica (Syloid type 244, W. R. Grace Co.) are subsequently added and dispersed by means of ultrasound. The resultant coating composition is filtered through a polyester fibre screen with a mesh width of 24 μm. The pH is adjusted to 7.0 by adding 2N lithium hydroxide solution. In the blank sample, the stabiliser is replaced by the same amount of water.

The coating compositions are coated onto photographic paper in a thickness of 50 μm using a wire coil. The coating obtained after drying with warm air has a dry weight of about 5.3 g/m² (or 5.0 g/m² without stabiliser) and contains 0.3 g/m² of stabiliser.

The recording material prepared in this way is printed with each of a yellow, a black and a purple-red ink in a "Think-Jet" ink-jet printer (Hewlett-Packard). The yellow ink contains 4 parts of C.I. Acid Yellow 23, 48 parts of diethylene glycol and 48 parts of water.

The purple-red and black inks are prepared analogously, but using C.I. Acid Red 249 and C.I. Food Black 2 respectively.

The inks are filtered through an ultrafilter having a pore size of 0.3 μm and introduced into the ink cartridge of the "Think-Jet" printer. Printed samples having a dot density of 75×75 dots per cm² are produced.

After storage for one week in order to fully dry the inks, the colour density (intensity) of the printed samples is measured using a densitometer (Macbeth TR 924) with a Status A filter. The sample prints are then exposed to an illumination intensity of 81 klux behind a filter comprising 6 mm thick window glass in an Atlas Weather-o-meter with a xenon lamp. The colour density was subsequently remeasured in order to determine the percentage drop in colour density.

The results are summarised in Tables 1-3 below. Low values indicate high light fastness. The exposure energies, given in $kJ/cm^2$, relate to the wavelength range from 300 to 800 nm.

TABLE 1

| Sample | Stabiliser | Drop in colour density (%) | | |
|---|---|---|---|---|
| | | Acid Yellow 23 after 10 $kJ/cm^2$ | Acid Red 249 after 10 $kJ/cm^2$ | Food Black 2 after 60 $kJ/cm^2$ |
| 1 | None | 51 | 50 | 27 |
| 2 | 3,5-Di-t-butyl-4-methoxybenzoic acid | 39 | 41 | 24 |
| 3 | 3-t-Butyl-4-hydroxybenzoic acid | 28 | 29 | 20 |

TABLE 2

| Sample | Stabiliser | Drop in colour density (%) Food Black 2 after 60 $kJ/cm^2$ |
|---|---|---|
| 1 | None | 36 |
| 2 | 2-Methoxybenzoic acid | 24 |
| 3 | 2-Ethoxybenzoic acid | 22 |
| 4 | 4-Methoxybenzoic acid | 21 |
| 5 | 4-Ethoxybenzoic acid | 21 |
| 6 | 4-Hydroxybenzoic acid | 18 |

TABLE 3

| Sample | Stabiliser | Drop in colour density (%) | | |
|---|---|---|---|---|
| | | Acid Yellow 23 after 15 $kJ/cm^2$ | Acid Red 249 after 15 $kJ/cm^2$ | Food Black 2 after 30 $kJ/cm^2$ |
| 1 | None | 69 | 72 | 18 |
| 2 | Salicylic acid | 31 | 40 | 10 |
| 3 | 3-Hydroxybenzoic acid | 35 | 51 | 13 |

EXAMPLE 2

Example 2 is carried out like Example 1, but the ink contains Acid Blue 9 as dye.

TABLE 4

| Sample | Stabiliser | Drop in colour density (%) Acid Blue 9 after 5 $kJ/cm^2$ |
|---|---|---|
| 1 | None | 61 |
| 2 | 3-t-Butyl-4-hydroxybenzoic acid | 43 |

The examples show that the compounds used according to the invention can provide long-term stabilisation for ink dyes.

EXAMPLE 3

Example 3 is carried out like Example 1, but a commercially available magenta ink is used for the ink-jet print (most concentrated of the three magenta inks from an ink cartridge for the Canon IK-8C ink-jet printer, called "IK-8C" in the examples below).

TABLE 5

| Sample | Stabiliser | Drop in colour density (%) after 5 $kJ/cm^2$ |
|---|---|---|
| 1 | None | 50 |
| 2 | 2-Methoxybenzoic acid | 25 |
| 3 | 3-tert-Butyl-4-hydroxybenzoic acid | 24 |

EXAMPLE 4

A coating composition is prepared as in Example 1 containing 45 parts of polyvinyl alcohol and 55 parts of silica (Syloid, type 244, W. R. Grace Co.). After the composition has been neutralised using lithium hydroxide, a polyethylene-coated paper base is coated with a cast weight of 8 $g/m^2$.

Ink-jet printing inks containing the following are prepared:

| Dye (C.I. Acid Yellow 23) | 4.0 g | 4.0 g |
|---|---|---|
| Stabiliser | 0.0 g | 10.0 g |
| Deionised water | 48.0 g | 43.0 g |
| Diethylene glycol | 48.0 g | 43.0 g |

An ink is prepared analogously, but with the C.I. Acid Yellow 23 replaced by the same amount of the dye C.I. Acid Red 249.

Furthermore, a commercially available magenta ink containing 0.4 g of stabiliser per 10 g is used for ink-jet printing (IK-8C, Canon).

Prints are produced (180 dots/inch) on a Quiet-Jet printer (Hewlett-Packard) using said inks. The light fastness of the prints is determined as described in Example 1. The results are summarised in Table 6.

TABLE 6

| Sample | Stabiliser | Drop in colour density (%), 10 $kJ/cm^2$ | | |
|---|---|---|---|---|
| | | Acid Yellow 23 | Acid Red 249 | IK-8C |
| 1 | — | 37 | 27 | 64 |
| 2 | 3-tert-Butyl-4-hydroxybenzoic acid* | 9 | 12 | 18 |
| 3 | 4-Hydroxy-3-tert-pentylbenzoic acid* | 11 | 10 | 16 |
| 4 | 3-tert-Butyl-3-hydroxybenzoic acid* | 4 | 8 | 15 |
| 5 | 3-(5'-Carboxy-2'-methylpent-2'-yl)-4-hydroxybenzoic acid* | 17 | 18 | 30 |
| 6 | 4-Hydroxy-3-tert-octylbenzoic acid* | 11 | 11 | 16 |
| 7 | 4-Hydroxy-3-(1'-methyl-1'-phenyl-ethyl)benzoic acid* | 17 | 12 | 20 |

*in the form of the lithium salt

EXAMPLE 5

It is usual to use cationic mordants to improve the water resistance of ink-jet prints, but they also significantly reduce the light stability. The compounds used according to the invention prove to be effective stabilisers even in the presence of cationic mordants.

The coating composition used in Example 4 is additionally provided with a mordant (0.3 $g/m^2$ of Polyfix 601, Showa High Polymer Co.). This coating composition is applied to a paper base and printed and exposed as described in Example 4. The light stability of the samples is shown in Table 7.

TABLE 7

| Sample | Stabiliser | Drop in colour density (%), 10 kJ/cm² | | |
|---|---|---|---|---|
| | | Acid Yellow 23 | Acid Red 249 | 1K-8C |
| 1 | — | 58 | 60 | 49 |
| 2 | 3-tert-Butyl-4-hydroxybenzoic acid* | 20 | 15 | 28 |
| 3 | 4-Hydroxy-3-tert-pentylbenzoic acid* | 21 | 15 | 27 |
| 4 | 3-tert-Butyl-3-hydroxybenzoic acid* | 13 | 15 | 26 |
| 5 | 3-(5'-Carboxy-2'-methylpent-2'-yl)-4-hydroxybenzoic acid* | 19 | 27 | 36 |
| 6 | 4-Hydroxy-3-tert-octylbenzoic acid* | 18 | 16 | 26 |
| 7 | 4-Hydroxy-3-(1'-methyl-1'-phenyl-ethyl)benzoic acid* | 20 | 14 | 29 |

*in the form of the lithium salt

EXAMPLE 6

The stabilisers used in inks in Examples 4 and 5 are incorporated as described in Example 1 into a recording material for ink-jet printing. The material is printed, dried and exposed as described in order to determine the drop in colour density. The results are shown in Table 8.

TABLE 8

| Sample | Stabiliser | Drop in colour density (%), 10 kJ/cm² | |
|---|---|---|---|
| | | Acid Yellow 23 | Acid Red 249 |
| 1 | — | 59 | 67 |
| 2 | 3-tert-Butyl-4-hydroxybenzoic acid* | 36 | 21 |
| 3 | 4-Hydroxy-3-tert-pentylbenzoic acid* | 34 | 19 |
| 4 | 3-tert-Butyl-3-hydroxybenzoic acid* | 31 | 20 |
| 5 | 3-(5'-Carboxy-2'-methylpent-2'-yl)-4-hydroxybenzoic acid* | 30 | 22 |
| 6 | 4-Hydroxy-3-tert-octylbenzoic acid* | 30 | 15 |
| 7 | 4-Hydroxy-3-(1'-methyl-1'-phenylethyl)benzoic acid* | 25 | 16 |

*in the form of the lithium salt

EXAMPLE 7

16.36 g of polyvinyl alcohol (10%) are mixed with 2.0 g of silica and 0.22 g of stabiliser and water and neutralised using lithium hydroxide. The solution is applied to a polyethylene-coated paper base in a cast weight of 5.3 g/m² (5.0 g/m² if no stabiliser is used). After drying, the coatings are printed as described in Example 1 with an ink containing Acid Red 249 as dye and exposed. The results are shown in Table 9.

TABLE 9

| Sample | Stabiliser | Drop in colour density (%), 10 kJ/cm² |
|---|---|---|
| 1 | — | 50 |
| 2 | Polyethylene glycol (350) monomethyl ether 4-tert-butyl-3-hydroxybenzoate | 33 |
| 3 | Polyethylene glycol (600) 4-tert-butyl-3-hydroxybenzoate | 32 |

TABLE 9-continued

| Sample | Stabiliser | Drop in colour density (%), 10 kJ/cm² |
|---|---|---|
| 4 | Polyethylene glycol (350) 4-tert-butyl-3-hydroxybenzoate | 33 |

EXAMPLE 8

Preparation of polyethylene glycol monomethyl ether (350) 3-tert-butyl-4-hydroxybenzoate 10 g of methyl 3-tert-butyl-4-hydroxybenzoate are dissolved in 20 ml of xylene and 18.5 g of polyethylene glycol monomethyl ether (350). The solution is treated with 0.25 g of sodium methoxide and stirred at 135° C. for 48 hours. The solvent is removed, and the residue is suspended in saturated sodium chloride solution. The solution is extracted with ethyl acetate, the organic phase is dried and evaporated, and the compound is purified by chromatography, giving 11.0 g of the product in the form of a pale yellowish oil.

EXAMPLE 9

Preparation of 4-acetoxy-3-tert-butylbenzoic acid

A mixture of 82.0 g of 2-tert-butyl-4-methylphenol, 140.0 g of acetic anhydride and 3.0 g of hydrobromic acid (48%) is heated at 90° C. for 1 hour. 280.0 g of acetic acid, 2.5 g of cobalt(II) acetate (tetrahydrate) and 2.5 g of manganese(II) bromide (tetrahydrate) are added, and oxygen (30 ml/min) is passed through the solution at 110° C. The acetic acid is partially removed by applying a vacuum. The reaction mixture which remains is poured into 500 ml of water and filtered, giving 99.5 g (84%) of the product in the form of colourless crystals having a melting point of from 180° to 182° C.

EXAMPLE 10

Preparation of 3-acetoxy-4-tert-butylbenzoic acid 32.8 g of 2-tert-butyl-5-methylphenol are oxidised by the procedure given in Example 9 to give 34.5 g (73%) of the product in the form of colourless crystals having a melting point of from 141° to 143° C.

EXAMPLE 11

Preparation of 4-acetoxy-3-tert-pentylbenzoic acid 35.7 g of 5-methyl-2-tert-pentylphenol are oxidised as described in Example 9 to give 13.7 g (27.5%) of the product in the form of colourless crystals having a melting point of from 164° to 166° C.

EXAMPLE 12

Preparation of 4-acetoxy-3-tert-octylbenzoic acid 44.0 g of 4-methyl-2-tert-octylphenol are oxidised as described in Example 9 to give 45.1 g (77%) of the product in the form of colourless crystals having a melting point of from 151° to 155° C.

EXAMPLE 13

Preparation of 4-acetoxy-3-(1-methyl-1-phenylethyl)benzoic acid 45.2 g of 4-methyl-3-(1-methyl-1-phenylethyl)phenol are oxidised as described in Example 9 to give 44.1 g (74%) of the product in the form of colourless crystals having a melting point of from 195° to 199° C.

EXAMPLE 14

Preparation of 4-acetoxy-3-(5'-methoxycarbonyl-2'-methylpent-2'-yl)benzoic acid 42.6 g of 2-(5'-methoxycarbonyl-2'-methylpent-2'-yl)-4-methylphenol are oxidised as described in Example 9 to give 27.1 g (49%) of the product in the form of colourless crystals having a melting point of from 106° to 108° C.

EXAMPLE 15

Preparation of 3-tert-butyl-4-hydroxybenzoic acid 50.0 g of 4-acetoxy-3-tert-butylbenzoic acid are dissolved in 200 g of methanol. A solution of 10.2 g of sodium hydroxide in 180 ml of water is added. The mixture is refluxed for 3 hours. The methanol is removed, and the mixture is acidified with hydrochloric acid (10%) at 10° C. The precipitate is filtered off and washed, giving 40.6 g of product in the form of colourless crystals having a melting point of from 158° to 159° C.

EXAMPLE 16

Preparation of 4-tert-butyl-3-hydroxybenzoic acid 30.0 g of 3-acetoxy-4-tert-butylbenzoic acid are reacted by the method of Example 15 to give 22.8 g (90%) of product in the form of colourless crystals having a melting point of from 188° to 190° C.

EXAMPLE 17

Preparation of 4-hydroxy-3-tert-pentylbenzoic acid 20.0 g of 4-acetoxy-3-tert-pentylbenzoic acid are reacted by the method of Example 15 to give 16.8 g (95%) of 4-hydroxy-3-tert-pentylbenzoic acid in the form of colourless crystals having a melting point of from 139° to 142° C.

EXAMPLE 18

Preparation of 4-hydroxy-3-tert-octylbenzoic acid 20.0 g of 4-acetoxy-3-tert-octylbenzoic acid are reacted by the method of Example 15 to give 16.0 g (93%) of 4-hydroxy-3-tert-octylbenzoic acid in the form of colourless crystals having a melting point of from 209° to 210° C.

EXAMPLE 19

Preparation of 4-hydroxy-3-(1-methyl-1-phenylethyl)benzoic acid 20.0 g of 4-acetoxy-3-(1-methyl-1-phenylethyl)benzoic acid are reacted by the method of Example 15 to give 15.8 g (93%) of 4-hydroxy-3-(1-methyl-1-phenylethyl)benzoic acid in the form of colourless crystals having a melting point of from 134° to 135° C.

EXAMPLE 20

Preparation of 4-hydroxy-3-(5'-carboxy-2'-methylpent-2'-yl)benzoic acid

A solution of 10.0 g of 4-acetoxy-3-(5'-methoxycarbonyl-2'-methylpent-2'-yl)benzoic acid in 35 g of methanol is treated with a solution of 8.0 g of potassium hydroxide in 100 ml of water. The mixture is refluxed for 7 hours, cooled, diluted with 200 ml of water which has been acidified using concentrated hydrochloric acid, and extracted with ethyl acetate. The extract is dried over magnesium sulfate, the solvent is removed, and the residue is recrystallised from aqueous ethanol, giving 6.9 g (83%) of 4-hydroxy-3-(5'-carboxy-2'-methylpent-2'-yl)benzoic acid of melting point 213° to 219° C.

What is claimed is:

1. An ink which contains at least one water-soluble compound of the formula

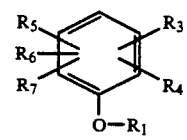

(1)

in which $R_1$ is hydrogen, alkyl having 1 to 4 carbon atoms, allyl or $-CO-CH_3$, $R_3$ and $R_4$, independently of one another, are hydrogen or $-CO_2^\ominus M^\oplus$, and $R_5$, $R_6$ and $R_7$, independently of one another, are hydrogen, alkyl in each case having 1 to 8 carbon atoms which is unsubstituted or substituted by $-CO_2R_8$, $-CO_2^\ominus M^\oplus$ or phenyl, or are $-CO_2R_8$ where $R_8$ is a group of the formula $+CH_2CH_2O)_{n=20}R_{11}$ in which $R_{11}$ is hydrogen, alkyl having 1 to 4 carbon atoms or a group of the formula

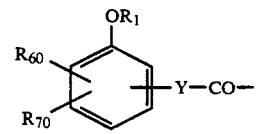

(1a)

in which $R_1$ is as defined above, Y is a direct bond or alkylene having 1 to 8 carbon atoms, and $R_{60}$ and $R_{70}$, independently of one another, are hydrogen or alkyl in each case having 1 to 8 carbon atoms, $M^\oplus$ is a monovalent, divalent or trivalent metal cation, $H^\oplus$ or a group of the formula $^\oplus N(R_{17})(R_{12})(R_{13})(R_{14})$ in which $R_{17}$, $R_{12}$, $R_{13}$ and $R_{14}$, independently of one another, are hydrogen, alkyl in each case having 1 to 8 carbon atoms, alkyl having 2 to 8 carbon atoms which is substituted by 1 to 3 hydroxyl groups or is interrupted by oxygen, alkenyl in each case having 3 to 5 carbon atoms or benzyl, at least one of the substituents $R_3$ to $R_7$ being $-CO_2^\ominus M^\oplus$ or $-CO_2R_8$.

2. A recording material which contains at least one compound of the formula (1)

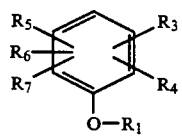

(1)

in which $R_1$ is hydrogen, alkyl having 1 to 4 carbon atoms, allyl or $-CO-CH_3$, $R_3$ and $R_4$, independently of one another, are hydrogen or $-CO_2^\ominus M^\oplus$, and $R_5$, $R_6$ and $R_7$, independently of one another, are hydrogen, alkyl in each case having 1 to 8 carbon atoms which is unsubstituted or substituted by $-CO_2R_8$, $-CO_2^\ominus M^\oplus$ or phenyl, or are $-CO_2R_8$ where $R_8$ is a group of the formula $+CH_2CH_2O)_{n=20}R_{11}$ in which $R_{11}$ is hydrogen, alkyl having 1 to 4 carbon atoms or a group of the formula

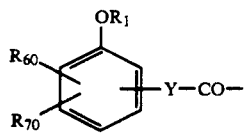

in which $R_1$ is as defined above, Y is a direct bond or alkylene having 1 to 8 carbon atoms, and $R_{60}$ and $R_{70}$, independently of one another, are hydrogen or alkyl in each case having 1 to 8 carbon atoms, $M^{\oplus}$ is a monovalent, divalent or trivalent metal cation, $H^{\oplus}$ or a group of the formula $^{\oplus}N(R_{17})(R_{12})(R_{13})(R_{14})$ in which $R_{17}$, $R_{12}$, $R_{13}$ and $R_{14}$, independently of one another, are hydrogen, alkyl in each case having 1 to 8 carbon atoms, alkyl having 2 to 8 carbon atoms which is substituted by 1 to 3 hydroxyl groups or is interrupted by oxygen, alkenyl in each case having 3 to 5 carbon atoms or benzyl, at least one of the substituents $R_3$ to $R_7$ being $-CO_2^{\ominus}M^{\oplus}$ or $-CO_2R_8$.

3. A recording material according to claim 2, which is an ink-jet printing material.

4. A process for stabilising ink-jet prints, which comprises (a) applying, as ink, an aqueous solution containing a water-soluble dye to a recording material for ink-jet printing which contains at least one compound of the formula (1)

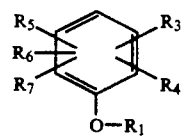

in which $R_1$ is hydrogen, alkyl having 1 to 4 carbon atoms, allyl or $-CO-CH_3$, $R_3$ and $R_4$, independently of one another, are hydrogen or $-CO_2^{\ominus}M^{\oplus}$, and $R_5$, $R_6$ and $R_7$, independently of one another, are hydrogen, alkyl in each case having 1 to 8 carbon atoms which is unsubstituted or substituted by $-CO_2R_8$, $-CO_2^{\ominus}M^{\oplus}$ or phenyl, or are $-CO_2R_8$ where $R_8$ is a group of the formula $-(CH_2CH_2O)_{\overline{n=20}}R_{11}$ in which $R_{11}$ is hydrogen, alkyl having 1 to 4 carbon atoms or a group of the formula

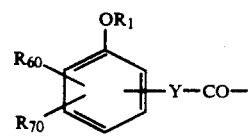

in which $R_1$ is as defined above, Y is a direct bond or alkylene having 1 to 8 carbon atoms, and $R_{60}$ and $R_{70}$, independently of one another, are hydrogen or alkyl in each case having 1 to 8 carbon atoms, $M^{\oplus}$ is a monovalent, divalent or trivalent metal cation, $H^{\oplus}$ or a group of the formula $^{\oplus}N(R_{17})(R_{12})(R_{13})(R_{14})$ in which $R_{17}$, $R_{12}$, $R_{13}$ and $R_{14}$, independently of one another, are hydrogen, alkyl in each case having 1 to 8 carbon atoms, alkyl having 2 to 8 carbon atoms which is substituted by 1 to 3 hydroxyl groups or is interrupted by oxygen, alkenyl in each case having 3 to 5 carbon atoms or benzyl, at least one of the substituents $R_3$ to $R_7$ being $-CO_2^{\ominus}M^{\oplus}$ or $-CO_2R_8$, and (b) drying the ink.

* * * * *